(12) United States Patent
Ubaña et al.

(10) Patent No.: US 12,662,200 B2
(45) Date of Patent: Jun. 23, 2026

(54) REAR FRAME AND SIDE WALL ASSEMBLY FOR TRAILERS

(71) Applicants: John Joven Dabu Ubaña, Savannah, GA (US); Samuel Marchant Ryerson, Savannah, GA (US); Bradley William Stephens, Clyo, GA (US); Christian Sungho Lee, Pooler, GA (US)

(72) Inventors: John Joven Dabu Ubaña, Savannah, GA (US); Samuel Marchant Ryerson, Savannah, GA (US); Bradley William Stephens, Clyo, GA (US); Christian Sungho Lee, Pooler, GA (US)

(73) Assignee: Great Dane LLC, Chicago, IL (US)

( * ) Notice: Subject to any disclaimer, the term of this patent is extended or adjusted under 35 U.S.C. 154(b) by 309 days.

(21) Appl. No.: 18/429,236

(22) Filed: Jan. 31, 2024

(65) Prior Publication Data

US 2025/0242871 A1     Jul. 31, 2025

(51) Int. Cl.
*B62D 33/04* (2006.01)
(52) U.S. Cl.
CPC .................................. *B62D 33/044* (2013.01)

(58) Field of Classification Search
CPC ..................................................... B62D 33/044
See application file for complete search history.

(56) References Cited

U.S. PATENT DOCUMENTS

| | | | | |
|---|---|---|---|---|
| 8,091,951 B1 * | 1/2012 | Fitzgerald | ............ | B62D 35/001 |
| | | | | 296/180.1 |
| 8,186,747 B2 * | 5/2012 | Bloodworth | ........... | B62D 21/20 |
| | | | | 180/209 |
| 11,136,072 B2 * | 10/2021 | Fenton | ................. | B62D 33/046 |
| 2017/0217505 A1 * | 8/2017 | Zehner | ................... | F16B 7/187 |
| 2023/0234491 A1 * | 7/2023 | Menz | ........................ | B60P 1/56 |
| | | | | 298/29 |

* cited by examiner

*Primary Examiner* — Edwin A Young
(74) *Attorney, Agent, or Firm* — Nelson Mullins Riley & Scarborough LLP

(57) ABSTRACT

A semi-trailer has a rear frame with a post extending vertically at a side of the rear frame adjacent a rear end of a trailer side wall. A joint is disposed between the post and the side wall rear end. The joint has a first portion that receives a portion of the rear end of the side wall and a second portion offset inward from the first portion that receives a portion of the post. At least one fastener extends through the portion of the post and the second portion of the joint, without extending through the exterior surface of the side wall.

12 Claims, 8 Drawing Sheets

REAR FRAME AND SIDE WALL ASSEMBLY FOR TRAILERS

TECHNICAL FIELD

Example embodiments generally relate to cargo carrying trailers and, in particular, to trailers having rear frame vertical posts.

BACKGROUND

A wide variety of trailers are known for carrying cargo. For example, a semi-trailer has one or more wheeled axles at the trailer's rear but no wheeled axle at the trailer's forward end, which instead may have a set of retractable legs to support the trailer when not attached to a tractor. A semi-trailer's forward end may have a kingpin to be received in a tractor's fifth wheel, as should be understood. A van type of semi-trailer typically includes a deck assembly supported by a side wall structure, wheels, and retractable front legs. The deck assembly may include longitudinal floor boards and transverse cross-members, such as I-beams, extending between opposing bottom rails. The deck transfers its load to the suspension, wheels, and, depending upon whether or not the trailer is coupled to a tractor or is free-standing, to a tractor fifth wheel or to retractable front supports.

Referring to FIG. 9, a prior trailer 90 has a cargo deck 92, two side walls 94 on opposing sides of the trailer and attached to opposing sides of deck 92, and a roof 96. Opposing side walls 12 may be identically constructed, though mirror images of each other. Roof 96 (which may comprise one or more roof sheets supported by roof bows) may be attached to side walls 94 by aluminum extruded top rails 98, and each side wall may be attached to deck assembly 92 by a respective aluminum extruded bottom rail 100 (one of each of which is shown in FIG. 9). Trailer 90 includes a retractable leg assembly, a forward end wall, and a rear end frame 102.

The two opposing side top rails 98 extend longitudinally along the cargo body and attach respective side walls to the roof. Similarly, the two opposing side bottom rails 100 extend longitudinally along the cargo body and attach respective side walls to the deck assembly. A pair of opposing extruded aluminum front posts extend vertically between and connect respective side walls to the forward end wall. An extruded aluminum front top rail extends transversely to the trailer's longitudinal dimension between the front posts and connects the forward end wall to the roof. A stainless-steel front bottom rail, generally parallel to the front top rail, connects the forward end wall to the deck assembly. The front posts are vertical and connect to side bottom rails 100, side top rails 98, the front top rail, and the front bottom rail, forming part of the body frame that holds together the side walls, floor, forward end wall, and roof. Similarly, a pair of opposing steel rear posts 104, which are elongated and disposed in the rear frame so that their dimension of elongation is vertical, steel rear top rail 106, and a steel rear bottom rail or sill 108 connect the side walls, roof, and floor at the vehicle's rear and connect the two side top rails 98 and side bottom rails 100 to form rear frame 102 and complete the body frame. Vertical posts 104 are riveted to top rails 98 and bottom rails 100 of both side frames. Four (or five) hinges 110 are mounted to and spaced apart vertically on each rear vertical post 104. A pair of doors (not shown) are hingedly attached to rear vertical posts 104 at hinges 110 so that, when closed, the doors completely close the space bounded by the rear frame and, thereby, enclose the cargo volume.

FIG. 10 provides a top section view of the leftward (in the perspective as shown in FIG. 9) fabricated steel rear post 104 as it attaches to its sheet-and-post side wall 94 (see FIG. 9) comprised of a plurality of vertical posts 112 (one of which is shown in FIG. 10), interior side wall liner panels 114 and outer skin 116. Rear post 104 comprises a main, generally rectangular, portion 118, a first flange 120 offset inward from the trailer exterior (toward the opposing side wall across the cargo volume), and a second flange 122 offset inward from first flange 120. This cross section of post 104 is generally consistent along its length from rear bottom sill 108 to rear top rail 106 (FIG. 9). First flange 120 receives aluminum outer skin 116, which is affixed to flange 120 by a plurality of vertically spaced apart rivets 124 (one of which is illustrated in FIG. 10). Second flange 122 receives the rearmost inner liner panel 114, which is affixed to second flange 122 by screws (not shown).

FIGS. 11 and 12 illustrate a prior dry freight trailer 90 in a composite plate type construction, in which each side wall 94 is formed from a plurality of composite plates 126 connected by elongated metal joints 128 therebetween by rivets that pass through the plate edges and joint edges. Each plate is a sandwich panel comprised of inner and outer steel outer plates 130 bordering a high-density polyethylene (HDPE) core. Fitted together in this manner, the composite plates provide structural support to the side wall between top and bottom rails 98 and 100, thereby enabling a frameless (or "monocoque") construction. The top and bottom of each plate are connected to top and bottom rails 98 and 100 by rivets.

FIG. 12 provides a top section view of the leftward (in the perspective of FIG. 11) fabricated steel rear post 104 as it attaches to its plate-type side wall 94 (see FIG. 11) comprised of one or more composite plates 126. Rear post 104 comprises a main, generally rectangular, portion 118 and a first flange 120 offset inward from the trailer exterior (toward the opposing side wall across the cargo volume). This cross section of post 104 is generally consistent along its length from rear bottom sill 108 to rear top rail 106 (FIG. 11). The exterior side of flange 120 receives composite plate 126, which is affixed to flange 120 by a plurality of vertically spaced apart rivets 124 (one of which is illustrated in FIG. 11).

FIGS. 13 and 14 illustrate a prior refrigerated trailer 90, in which each of side walls 94 is constructed of an inner fiber reinforced polymer (FRP) panel 132 and an exterior. 0.040" aluminum panel 134 separated by a welded steel frame fitted with wooden or foam spacers (between the side wall frame and the inner and exterior panels) to reduce thermal conductivity and enclose the inner volume between the panels. That inner volume is then injected with foam resins that expand, harden, and cure, adhering to the inner and exterior panels and framing to produce, together, a monolithic rigid structural wall panel that extends the entire length of the trailer. Each side wall, front wall, roof and rear doors are, in one or more embodiments, similarly constructed and are assembled to form, with the deck assembly, an insulated cargo box.

FIG. 14 provides a top section view of the leftward (in the perspective of FIG. 13) fabricated steel rear post 104 as it attaches to its refrigerated trailer side wall 90 (See FIG. 13) comprised of an inner FRP panel 132 and one or more exterior aluminum panels 134 separated by foam 138 therebetween. Rear post 104 comprises a main, generally rectangular, portion 118 and a flange 120 offset inward from the trailer exterior (toward the opposing side wall across the cargo volume). This cross section of post 104 is generally consistent along its length from rear bottom sill 108 to rear top rail 106 (FIG. 13). Along the same length, an aluminum extrusion 140 generally maintains the cross-sectional geometry shown in FIG. 14, comprising a first flange 142 that is generally planar with an exterior face parallel to the trailer exterior, a generally planar first center portion 144 that is generally perpendicular to the plane of first flange 142, a third generally planar flange 146 that is generally perpendicular to second flange 144 and parallel to first flange 142, a generally planar second center portion 148 that is generally perpendicular to the planes of first flange 142 and third flange 146, and a generally planar fifth flange 150 that is generally perpendicular to flanges 144 and 148 and parallel to first flange 136 and third flange 146. Each of third flange 146 and fifth flange 150 is offset inward (toward the opposing side wall across the cargo volume) of first flange 142, and fifth flange 150 is offset inward of third flange 146.

Aluminum extrusion 140 forms the rear end of the insulated side wall. The exterior of extrusion first flange 142 receives the interior side of the exterior FRP panel 134, which is affixed to first flange 142 by a plurality of vertically spaced apart rivets 136. The interior side of extrusion fifth flange 150 receives inner FRP panel 132 by an double sided adhesive tape. Foam 138 filled the volume between panels 132 and 134 and extrusion 140. A plurality of vertically spaced apart blind fasteners 124 (one of which is shown in FIG. 14) extended through flange 120 of roll form steel post 104 and exterior panel 134, thereby fixing those components to each other.

SUMMARY

According to an example embodiment, a semi-trailer has a wheeled chassis having at least two wheeled axles at a rearward end of the wheeled chassis, retractable legs, and a kingpin at a forward end of the wheeled chassis, wherein the wheeled chassis is elongated in a longitudinal dimension from the forward end to the rearward end. A body has a cargo deck supported by the wheeled chassis, a front wall at the forward end of the wheeled chassis, a pair of opposing side walls extending between the front wall and the rearward end of the wheeled chassis, a rear frame attached to the rearward end of the wheeled chassis and to each side wall at a rearward end of the side wall so that a cargo volume is bounded by the cargo deck, the front wall, the pair of opposing side walls, and the rear frame. The rear frame has a first post extending vertically at a side of the rear frame adjacent a rear end of a first side wall of the pair of opposing side walls, and a first joint disposed between the first post and the rear end of the first side wall. The first joint has a first portion that defines a first receiving surface that receives a portion of the rear end of the first side wall that includes a surface of the first side wall that is exterior with respect to the cargo volume, and a second portion offset, in a dimension transverse to the longitudinal dimension and inward with respect to the cargo volume, from the first portion that defines a second receiving surface that receives a portion of the first post. At least one fastener extends through the portion of the first post and the second portion of the first joint, without extending through the exterior surface of the first side wall.

In a further embodiment, a semi-trailer has a wheeled chassis having at least two wheeled axles at a rearward end of the wheeled chassis, retractable legs, and a kingpin at a forward end of the wheeled chassis. The wheeled chassis is elongated in a longitudinal dimension from the forward end to the rearward end. A body has a cargo deck supported by the wheeled chassis, a front wall at the forward end of the wheeled chassis, a pair of opposing side walls extending between the front wall and the rearward end of the wheeled chassis, and a rear frame attached to the rearward end of the wheeled chassis and to each side wall at a rearward end of the side wall so that a cargo volume is bounded by the cargo deck, the front wall, the pair of opposing side walls, and the rear frame. The rear frame has a first elongated post extending vertically in its dimension of elongation at a side of the rear frame adjacent a rear end of a first side wall of the pair of opposing side walls, and a second elongated post extending vertically in its dimension of elongation at a side of the rear frame adjacent a rear end of a second side wall of the pair of opposing side walls, a first joint disposed between the first post and the rear end of the first side wall, and a second joint disposed between the second post and the rear end of the second side wall. The first joint has a first portion that defines a first receiving surface that receives a portion of the rear end of the first side wall that includes a surface of the first side wall that is exterior with respect to the cargo volume, and a second portion offset, in a dimension transverse to the longitudinal dimension and inward with respect to the cargo volume, from the first portion that defines a second receiving surface that receives a portion of the first post. The second joint has a third portion that defines a third receiving surface that receives a portion of the rear end of the second side wall that includes a surface of the second side wall that is exterior with respect to the cargo volume, and a fourth portion offset, in a dimension transverse to the longitudinal dimension and inward with respect to the cargo volume, from the third portion that defines a fourth receiving surface that receives a portion of the second post. A plurality of fasteners extend through the portion of the first post and the second portion of the first joint, without extending through the exterior surface of the first side wall. A plurality of fasteners extend through the portion of the second post and the fourth portion of the second joint, without extending through the exterior surface of the second side wall.

The accompanying drawings, which are incorporated in and constitute a part of this specification, illustrate one or more embodiments of the invention and, together with the description, serve to explain the principles of the disclosure herein.

BRIEF DESCRIPTION OF THE DRAWINGS

The disclosure herein references the accompanying drawings, in which some, but not, all embodiments of the disclosure are shown. Indeed, the subject matter of the present disclosure may be embodied in many different forms and should not be construed as limited to the embodiments set forth herein.

Figure 1:
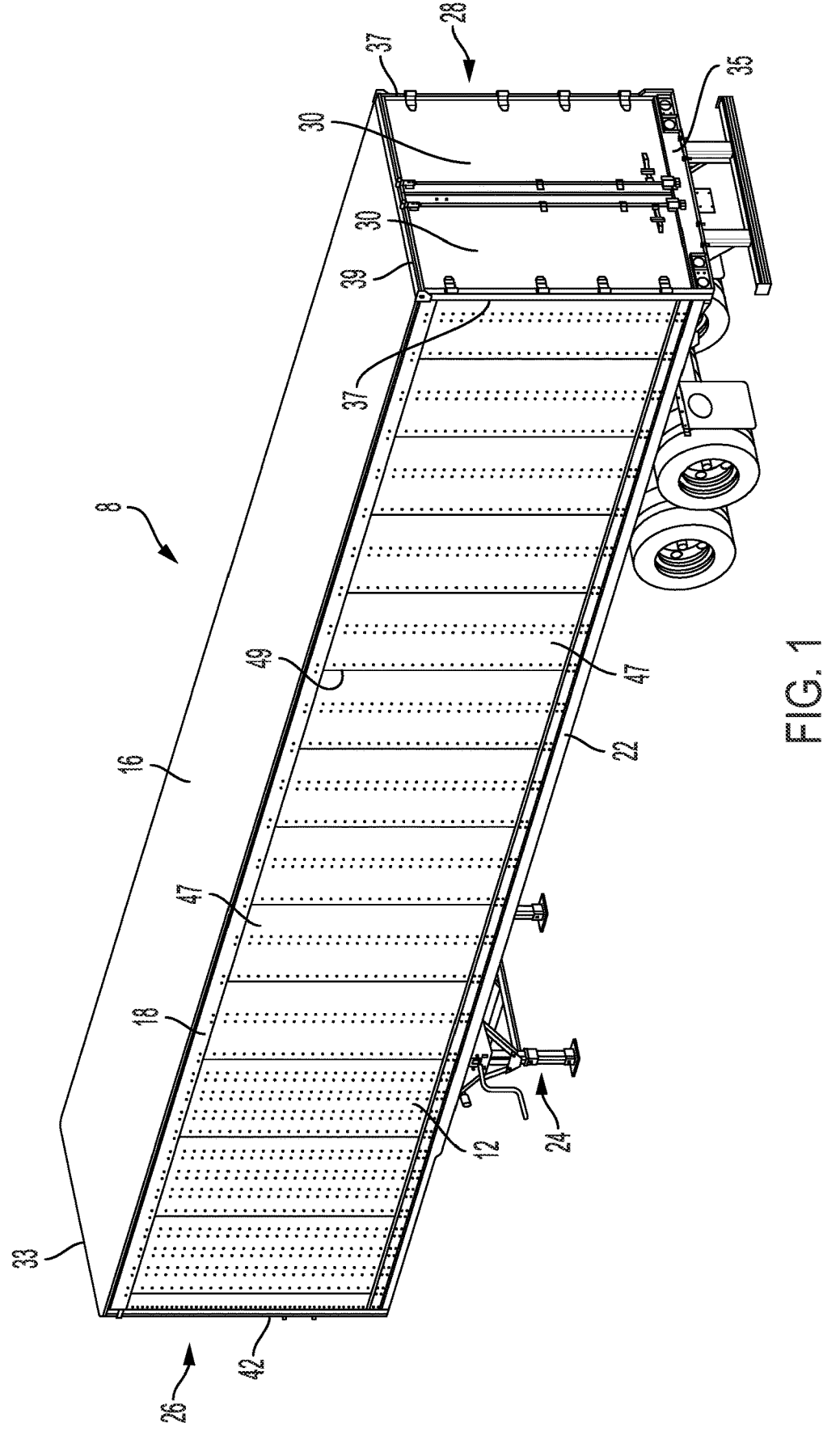
FIG. 1 is a perspective view of a semi-trailer having a rear frame assembly in accordance with an embodiment of the present invention.

Repeat use of reference characters in the present specification and drawings is intended to represent same or analogous features or elements of the present disclosure.

DETAILED DESCRIPTION

Reference will now be made in detail to present embodiments of the disclosure, one or more examples of which are illustrated in the accompanying drawings. Each example is provided by way of explanation of the disclosure, not limitation of the disclosure. In fact, it will be apparent to those skilled in the art that modifications and variations can be made in the present disclosure without departing from the scope or spirit thereof. For instance, any number of features illustrated or described as part of one embodiment may be used on another embodiment, in any combination, to yield a still further embodiment. Thus, it is intended that the present disclosure covers such modifications and variations as come within the scope of the appended claims and their equivalents.

It should be understood that terms of orientation, e.g. "forward," "rearward," "upper," "lower," and similar terms as used herein are intended to refer to relative orientation of components of the devices described herein with respect to each other under an assumption of a consistent point of reference but do not require any specific orientation of the overall system. Thus, for example, the discussion herein may refer to a "forward" or "front" end of semi-trailer, referring to a direction toward the end of the trailer that has the kingpin that is received by a fifth wheel at the "rearward" or "rear" end of a tractor, or a "rearward" end of the trailer, referring to a direction toward the trailer's rear, at which the rear frame and door(s) are disposed. The present discussion may also refer to "upper" and/or "lower" surfaces of the trailer and/or its components, generally with regard to the orientation of the trailer as shown in FIG. 1. Terms such as "horizontal" and "vertical," for example, refer to orientations under an assumption that a semi-trailer as in FIG. 1 is disposed in its operative position, such as shown at FIG. 1, on a level, horizontal surface. Such terms may be used in the present disclosure and claims and will be understood to refer to a relative orientation but not to an orientation of the trailer with respect to an external frame of reference. Further, the term "end" should be understood to encompass a part of something and inward of a boundary or edge thereof, rather than just the boundary or edge.

Further, either of the terms "or" and "one of B," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The disclosure herein refers to "fasteners." As should be understood, a fastener is a member that attaches one or more structures to each other through mechanical engagement. Thus, for example, screws, bolts, and rivets are fasteners, but adhesives are not considered fasteners.

Example rear frame and side wall assemblies may be utilized with semi-trailer trucks having a tractor (not shown) and a semi-trailer, various examples of which, at 8, are shown in FIGS. 1 through 8. FIG. 1 illustrates an example of a semi-trailer according to one or more embodiments of a trailer in which the side walls are constructed of composite plates. While other figures as discussed herein refer to side walls of different panel constructions, it should be understood that various structures and components of the trailer discussed with regard to FIG. 1 are also applicable to one or more embodiments of other types of semi-trailers discussed herein having a rear frame and side wall. Referring to the one or more embodiments as in FIGS. 1 and 4, trailer 8 has a floor or cargo deck 10, two side walls 12 on opposing sides of the trailer that are attached to opposing sides of floor 10, and a roof 16. Opposing side walls 12, in one or more embodiments, are identically constructed, though mirror images of each other. Roof 16 (which in one or more embodiments comprise one or more roof sheets supported by roof bows) are attached to side walls 12 by aluminum extruded top rails 18, and each side wall is attached to floor or deck assembly 10 by a respective aluminum extruded bottom rail 22 (one of each of which is shown in FIG. 1). The example trailer 8 includes a retractable leg assembly 24, a forward end wall 26 (not visible in FIG. 1), and a rear end frame 28. Once assembled, the front wall, roof, deck assembly, side walls and rear frame form a trailer cargo body that defines a cargo volume 29 and that has a generally rectangular (which may include a square) cross-section when viewed from the rear.

The two opposing elongated side wall top rails 18 extend longitudinally (in the dimension, indicated at 31, of the trailer's elongation) along the cargo body and attach respective side walls 12 to roof 16. The top rails may be considered part of both their respective side walls and the roof. Similarly, the two opposing elongated side bottom rails 22 extend longitudinally along the cargo body and attach respective side walls 12 to deck assembly 10 and, thereby, to the flooring thereof. The bottom rails may be considered part of both their respective side walls and the deck assembly. A pair of opposing extruded aluminum front posts 42 (one of which is shown in FIG. 1) extend vertically between and connect respective side walls 12 to front wall 26. An extruded aluminum front top rail 33 extends transversely to trailer longitudinal dimension 31 between front posts 42 and connects front wall 26 to roof 16. An aluminum extruded front bottom rail (not shown), generally parallel to front top rail 33, connects front wall 26 to deck assembly 10. Front posts 42 are elongated and are disposed so that their dimension of elongation is vertical. In one or more embodiments, they connect to side bottom rails 22, side top rails 18, front top rail 33, and the front bottom rail, forming part of the body frame that holds together the side walls, floor, front wall, and roof. Similarly, a pair of opposing fabricated steel rear posts 37, which are elongated and disposed in the rear frame so that their dimension of elongation is vertical, steel rear top rail 39, and a steel rear bottom rail or sill 35 connect the side walls, roof, and floor at the vehicle's rear and connect the two side top rails 18 and side bottom rails 22 to form rear frame 28 and complete the body frame. In one or more other embodiments, the vertical posts are made of roll form steel, in particular where swinging doors are used at the rear frame. Vertical posts 37 are riveted to top rails 18 and bottom rails 22 of both side frames. Four or more hinges 41 are mounted to and spaced apart vertically on each rear vertical post 37. A pair of doors 30 are hingedly attached to rear vertical posts 37 at hinges 41 so that, when closed, doors 30 completely close the space bounded by the rear frame and, thereby, enclose the cargo volume. In one or more other embodiments, a single roll door is used instead of hinged swing doors.

Deck assembly 10 may also have a variety of configurations and may, for example, comprise a generally planar wooden, polymer, or aluminum top floor sheet, in some embodiments covering an insulation material, and supported underneath by transverse cross members of the deck assembly that attach at their respective ends to side bottom rails 22.

Figure 2:
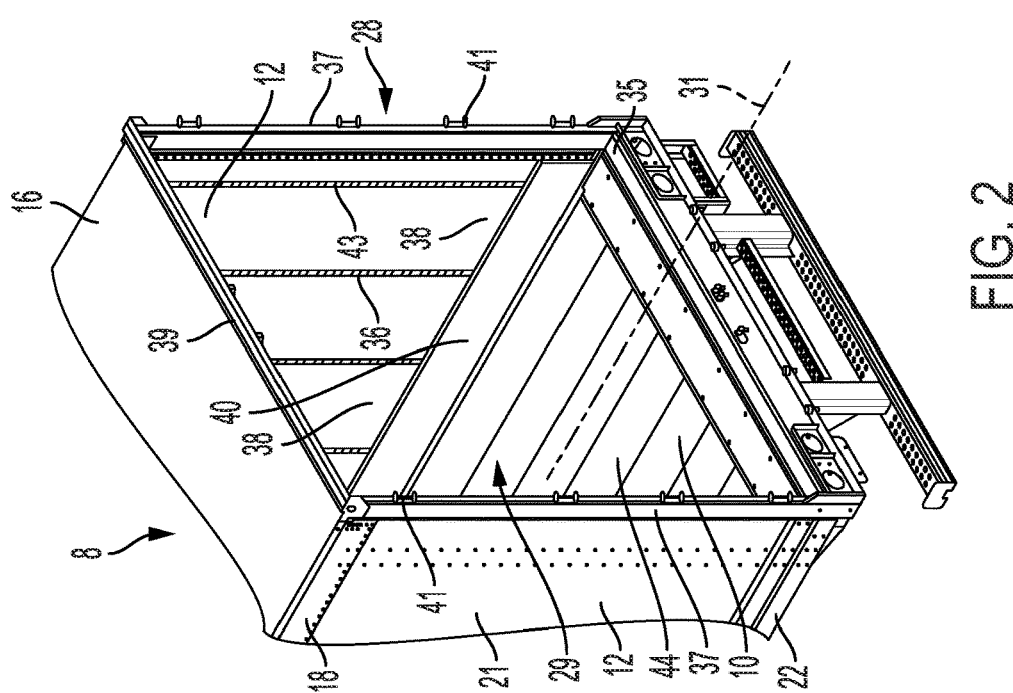
FIG. 2 is a partial perspective view of a semi-trailer having a rear frame assembly in accordance with an embodiment of the present invention.

FIG. 2 illustrates a dry freight trailer 8 in a sheet-and-post type construction, in which side wall 12 includes a plurality of vertical posts 36, a plurality of interior side wall liner panels 38, and one or more scuff bands 40. The liner panels interconnect the posts on the inner sides of the two side walls, and the scuff band is received within a recessed portion of a bottom portion of each post 36. Each post 36 includes a longitudinal front face 43 through which is defined a series of apertures for receipt of cargo straps and the like to secure the trailer contents.

Interior liner panels 38 are fastened to posts 36 by screws, rivets, tapit pins, or any other suitable method. The panels are constructed of plywood, polymer, or other suitable material, for example steel. Corrugated metal panels, when used, include a plurality of recessed channels that give the panels added structural strength and stiffness. Posts 36 are fastened to top rail 18 by suitable means such as rivets, screws, or the like. Thus, the inner panels are secured to the top rail though their connection to the posts, but they may be directly attached to the top rail as well, by similar fasteners. A portion of the top rail to which posts 36 are fastened extends behind inner liner panels 38.

Scuff band 40 is, in one or more embodiments, of a generally corrugated metal construction. However, the scuff band may be constructed of any suitable material, for example wood, with or without a protective metal plate attached, or a non-corrugated metal. In one or more embodiments, scuff band 40 is formed from three-quarter inch plywood or sixteen gauge galvanized steel corrugated to a one-quarter inch depth.

An outer skin 21 is fastened to rear flanges of vertical posts 36, to the trailer's top and bottom rails 18 and 22, and to front vertical posts 42 by rivets or other suitable means and is connected to rear frame 28, and in particular rear vertical posts 37, as discussed below. In one or more embodiments, outer skin 21 is constructed of "nominal" 050 aluminum, having a thickness of approximately 0.047 inches and extends the entire length of the trailer side wall.

Trailer floor 10 includes two longitudinally oriented (in their respective dimensions of elongation) steel zee-shaped members (not visible in FIG. 2) between bottom rail 22 and respective longitudinally oriented elongated wooden floor planks 44 (i.e. the planks' dimension of elongation is parallel to dimension 31). The zee-shaped members and the floor planks sit on a plurality of elongated transverse (having dimensions of elongation transverse to dimension 31) I-beams 50 (see FIGS. 6 and 8). Each I-beam includes an end plate welded to each end, and the end plates are fastened to a bottom portion of bottom rail 22. Wooden planks 44 may be held between opposing zee-shaped members by friction, or the planks may be bolted or otherwise fastened to I-beams 50 and/or the zee-shaped members. The zee-shaped members, in one or more embodiments, are intermittently attached to bottom rails 22, I-beams 50, and/or planks 44.

Figures 4, 5:
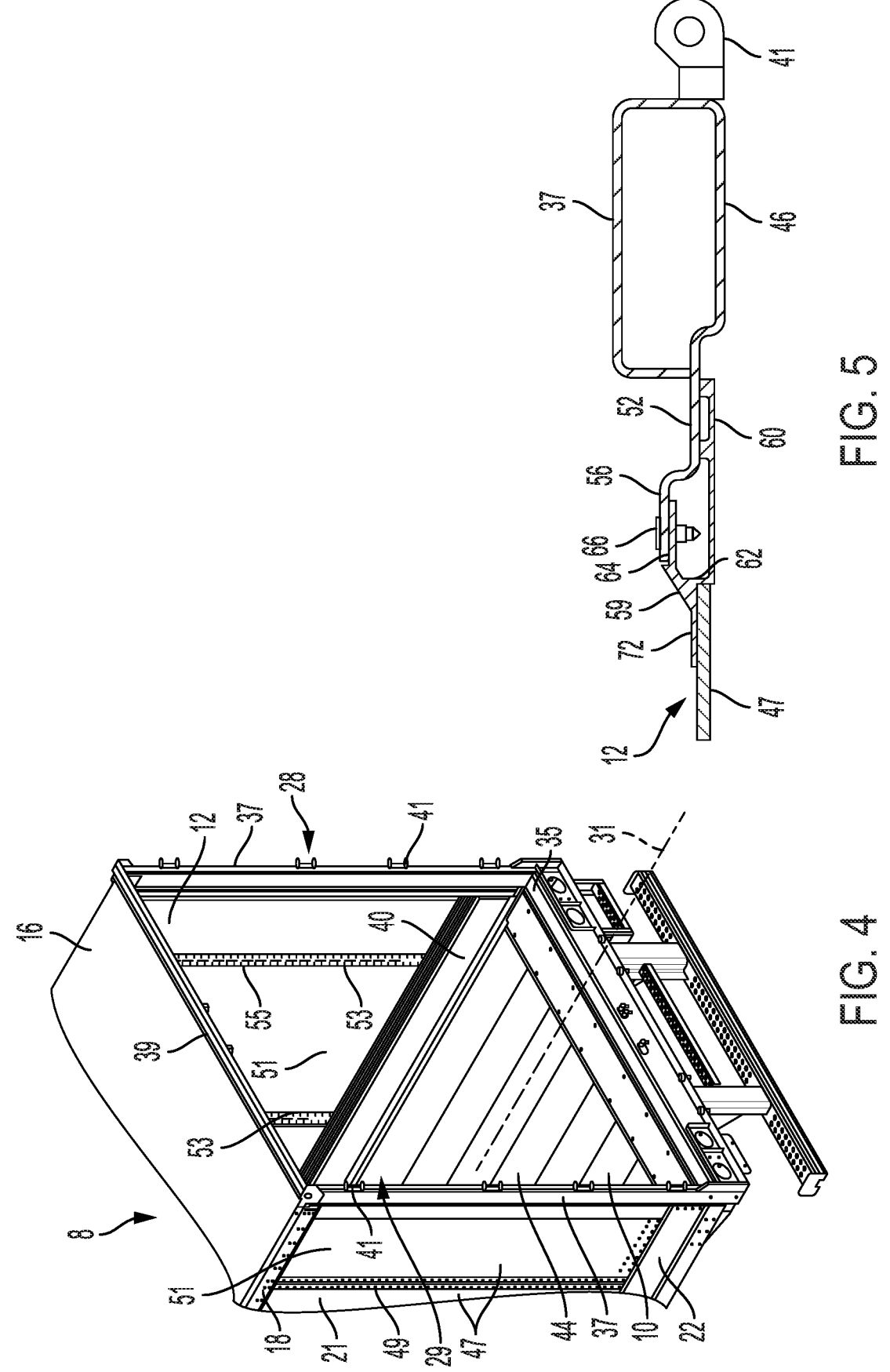
FIG. 4 is a partial perspective view of the trailer as in FIG. 1.
FIG. 5 is a partial top sectional view of the trailer as in FIG. 4.

FIGS. 1 and 4 illustrate a dry freight trailer 8 in a composite panel or plate type construction, in which each side wall 12 is formed from a plurality of composite plates 47 connected by elongated metal joints 49 therebetween by screws, rivets, tapit pins, or other suitable fasteners that pass through the plate edges and joint edges, or by other suitable connection method. Each of a plurality of elongated logistics tracks 53 is attached to a respective joint member 49 on the joint member's inward side by such fasteners so that the logistics tracks are spaced apart from each other and aligned (in their dimension of elongation) vertically. Each logistics track includes a longitudinal front face 55 through which is defined a series of apertures for receipt of cargo straps and the like to secure the trailer contents. Each plate is a sandwich panel comprised of inner and outer steel skins 51 bordering an HDPE core. Fitted together in this manner, the structural composite plates, attached by the joints, provide structural support to the side wall between the top and bottom rails, forming a frameless (or "monocoque") construction. The top and bottom of each resulting plate side wall are connected to top and bottom rails 18 and 22 by rivets, screws, tapit pins, or other suitable means.

In one or more other plate-type embodiments, each composite panel has an exterior skin sheet that overlaps the exterior skin sheet of the adjacent panel and is attached thereto by screws, rivets, or tapit pins that pass through the two overlapping edges, or by other suitable connection method. The elongated joint members of the embodiments as in FIG. 2 are omitted, being replaced by the overlap seams of the adjacent exterior skin sheets. The outer skins are thereby fitted together in this manner to form a continuous outer skin. To construct a thermal insulated wall panel, an inner liner panel is spaced apart from the outer skin formed by the exterior skin sheets, and thermal insulating foam is blown or poured into the channel between the outer skin and the inner liner panel. Fitted together in this manner, the outer skin, foam core and inner liner panel provide structural support to the side wall between the top and bottom rails, forming a monocoque construction. The top and bottom of each resulting plate side wall are connected to the top and bottom rails by rivets, screws, tapit pins, or other suitable means. A plurality of logistics tracks are spaced apart from each other and aligned (in their dimension of elongation) vertically against a continuous inner liner panel. Each logistics track is attached to its side wall plate by a plurality of screws, rivets, tapit pins, or other suitable mechanism passing through the logistics track and the side wall plate.

Each overlapping outer skin is, in one or more embodiments, formed from polymer, aluminum, stainless steel or other metal alloy, and the inner panel liner is, in one or more embodiments, formed from a thermoset or thermoplastic glass reinforced composite. Examples of inner liner panel materials include polyester-based thermoset composites, such as KEMLITE LTR or ARMORTUF available from Kemlite Company of Joliet, Ill., and polypropylene-based thermoplastic materials, such as BULITEX, available from US Liner Company of Ambridge, Pa. As should be well understood, "thermoset" refers to a class of polymers that, when cured using heat, chemical or other means, change into a substantially infusible and insoluble material. Once cured, a thermoset material will not soften, flow, or distort appreciably when subjected to heat and/or pressure. "Thermoplastic," on the other hand, refers to a class of polymers that can be repeatedly softened by heating and hardened by cooling through a temperature range characteristic of the particular polymer and that in the softened state can be shaped. Whether thermoset or thermoplastic, the glass reinforced composite of the inner liner panel is generally gas permeable with respect to the gas blowing agents entrapped in the foamed polymer used to form the insulating core and may, therefore, be assembled with an interior gas impermeable liner. In other embodiments, however, the interior liner panel is made from a sheet of gas impermeable material such as wrought aluminum or stainless steel, for example a 0.020 or 0.040 inch thick stainless steel liner panel.

In one or more embodiments, a polyurethane core between the inner liner panel and exterior skins is about 1.50 inches thick and tends to form a series of closed cells, in each of which is embedded a low thermal conductivity gas such as CFC 141 b, HCFC 22 or HFC 134 a. Gas is introduced into the core cells when the polyurethane foam in a liquid state is poured in place and reacts to form a rigid polyurethane insulating foam. The impregnated gas is distributed throughout the solid core material and generally represents approximately 98% of the core material, the remainder being the polyurethane cell walls surrounding the gas. It should be understood in this art that other thermal insulating core materials may be used to form the thermal insulated wall panels, such as STYROFOAM® (styrenic foams), PVC foams, or fiberglass batting.

In either such type of composite plate embodiment, A scuff band 40, extending in its dimension of elongation longitudinally parallel to trailer elongation dimension 31, is disposed at the inner surface of each side wall adjacent floor 10 and is attached to the logistics tracks by screws or other suitable mechanism.

Figures 6, 7:
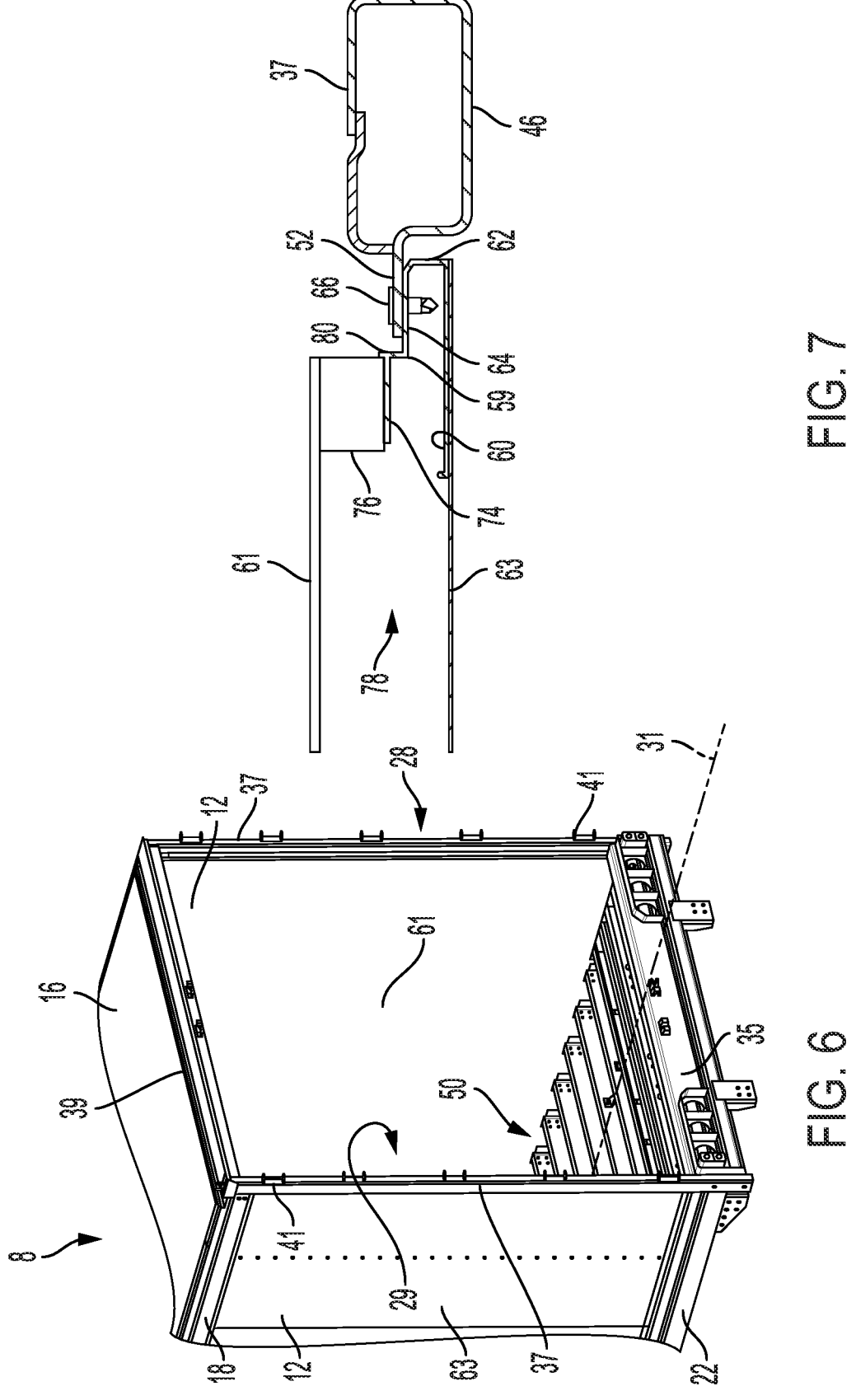
FIG. 6 is a partial perspective view of a semi-trailer having a rear frame assembly in accordance with an embodiment of the present invention.
FIG. 7 is a top sectional view of the trailer as in FIG. 6.

FIG. 6 illustrates a refrigerated trailer 8. In one or more embodiments thereof, each of side walls 12 may be constructed of a continuous (over the length of the trailer side wall) inner fiber reinforced polymer (FRP) panel 61 and an exterior. 0.040" aluminum panel 63 separated by a welded steel frame fitted with wooden or foam spacers (between the side wall frame and the inner and exterior panels) to reduce thermal conductivity and enclose the inner volume between the panels. Exterior panel 63 may be continuous over the length of the trailer side wall or may be comprised of a plurality of overlapping panels connected by structural adhesive or fasteners. That inner volume is then injected with foam resins that expand, harden, and cure, adhering to the inner and exterior panels and framing to produce, together, a rigid structural wall panel. Each side wall, front wall, roof and rear doors are, in one or more embodiments, similarly constructed and are assembled to form, with the deck assembly, an insulated cargo box. In view of the present disclosure, it should be understood that the vehicle structure may vary. For instance, the wall structures may be formed in a foam-insulated sheet-and-post construction. Thus, it should be understood that the vehicle structures specifically discussed herein are solely for purposes of example and are not presented for purposes of limitation of the present disclosure.

Figure 8:
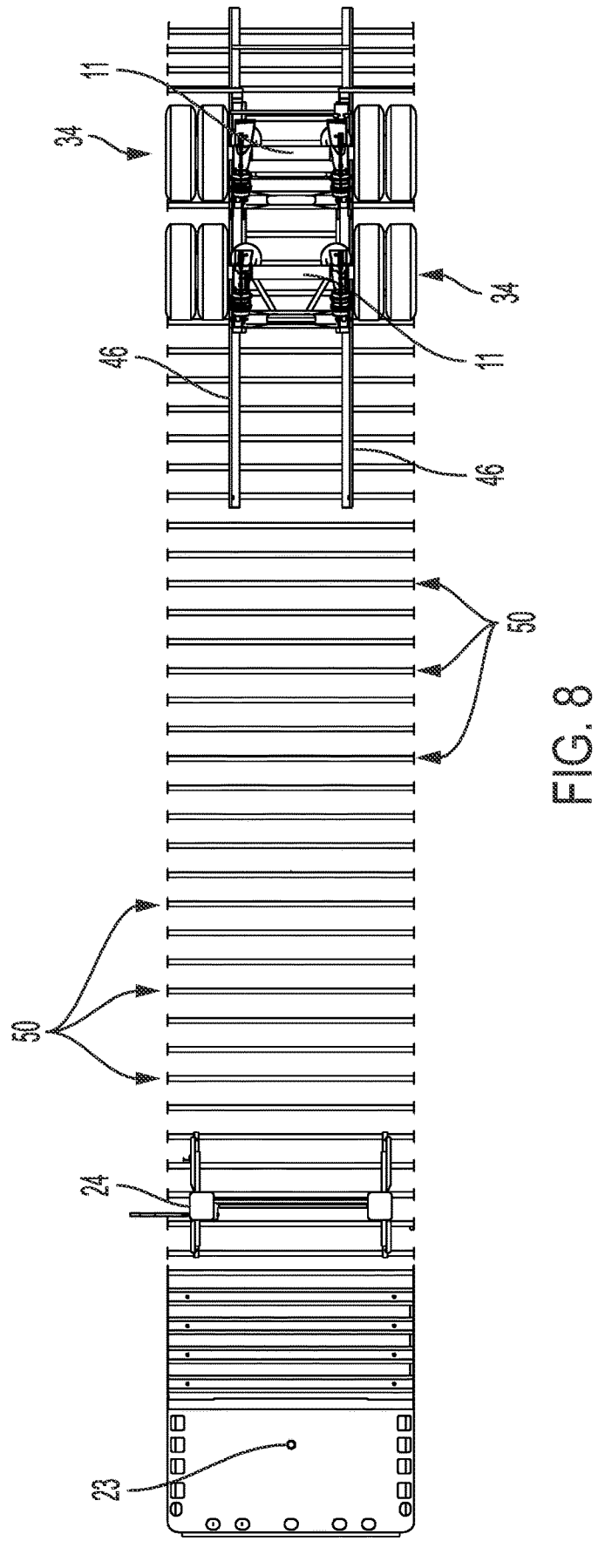
FIG. 8 is a partial bottom view of a semi-trailer of the embodiments as in FIGS. 1, 2, 4, and 6.
Figures 9, 10:
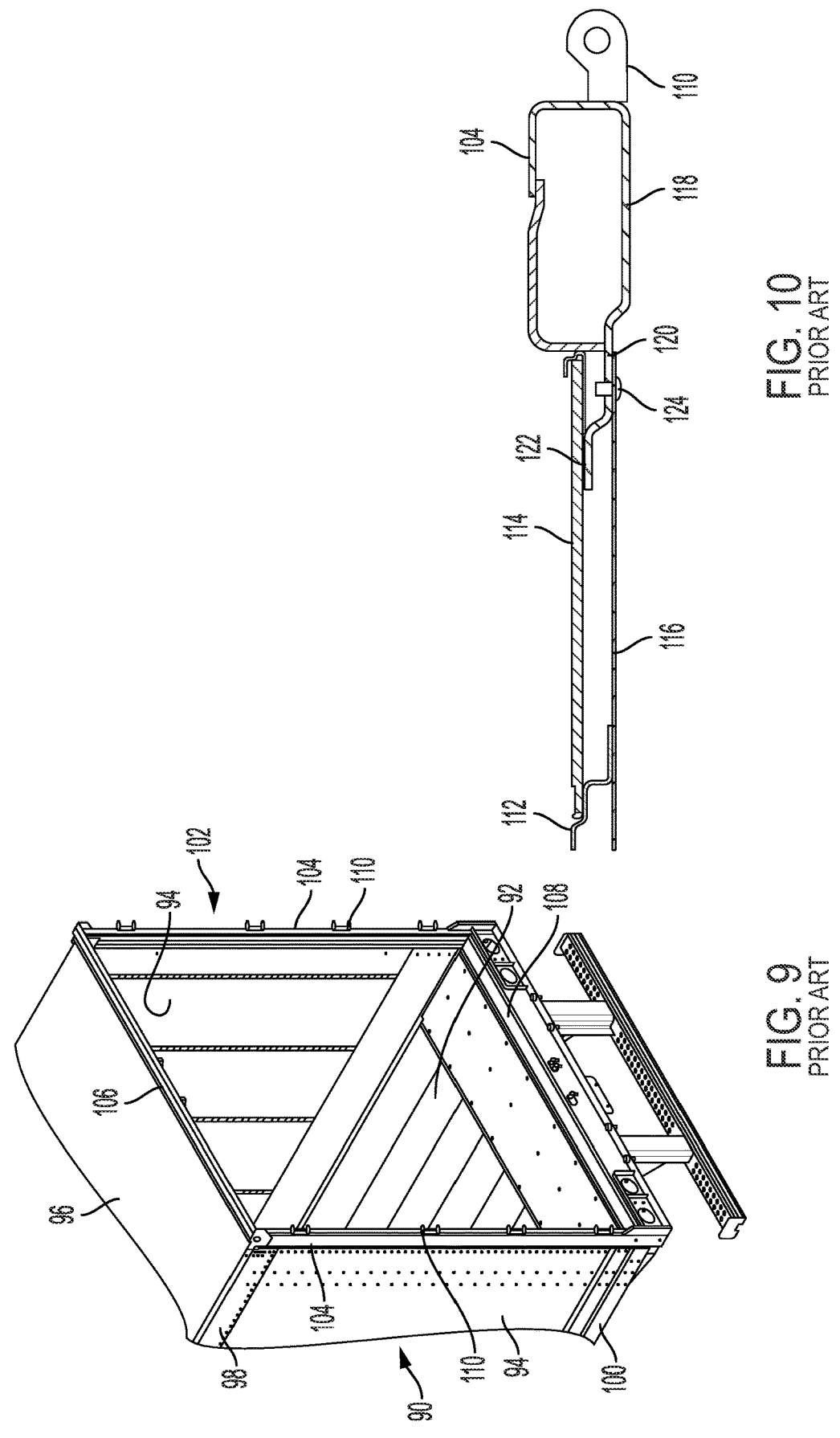
FIG. 9 is a partial perspective view of a prior art semi-trailer.
FIG. 10 is a partial top sectional view of the trailer as in FIG. 9.
Figure 12:
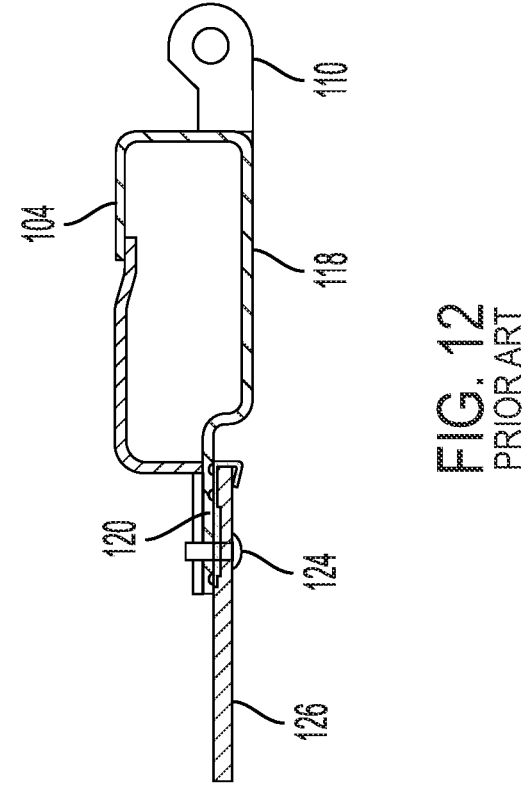
FIG. 12 is a partial top sectional view of the trailer as in FIG. 11.
Figure 11:
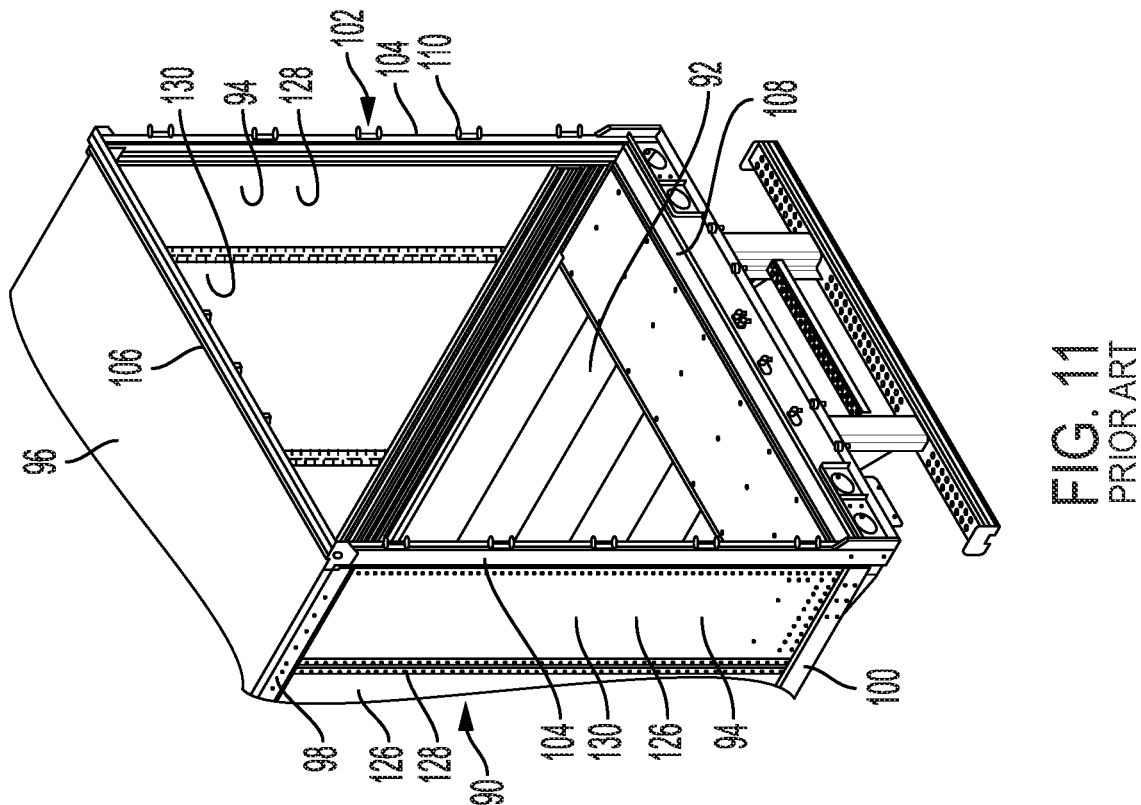
FIG. 11 is a partial perspective view of a prior art semi-trailer.
Figures 13, 14:
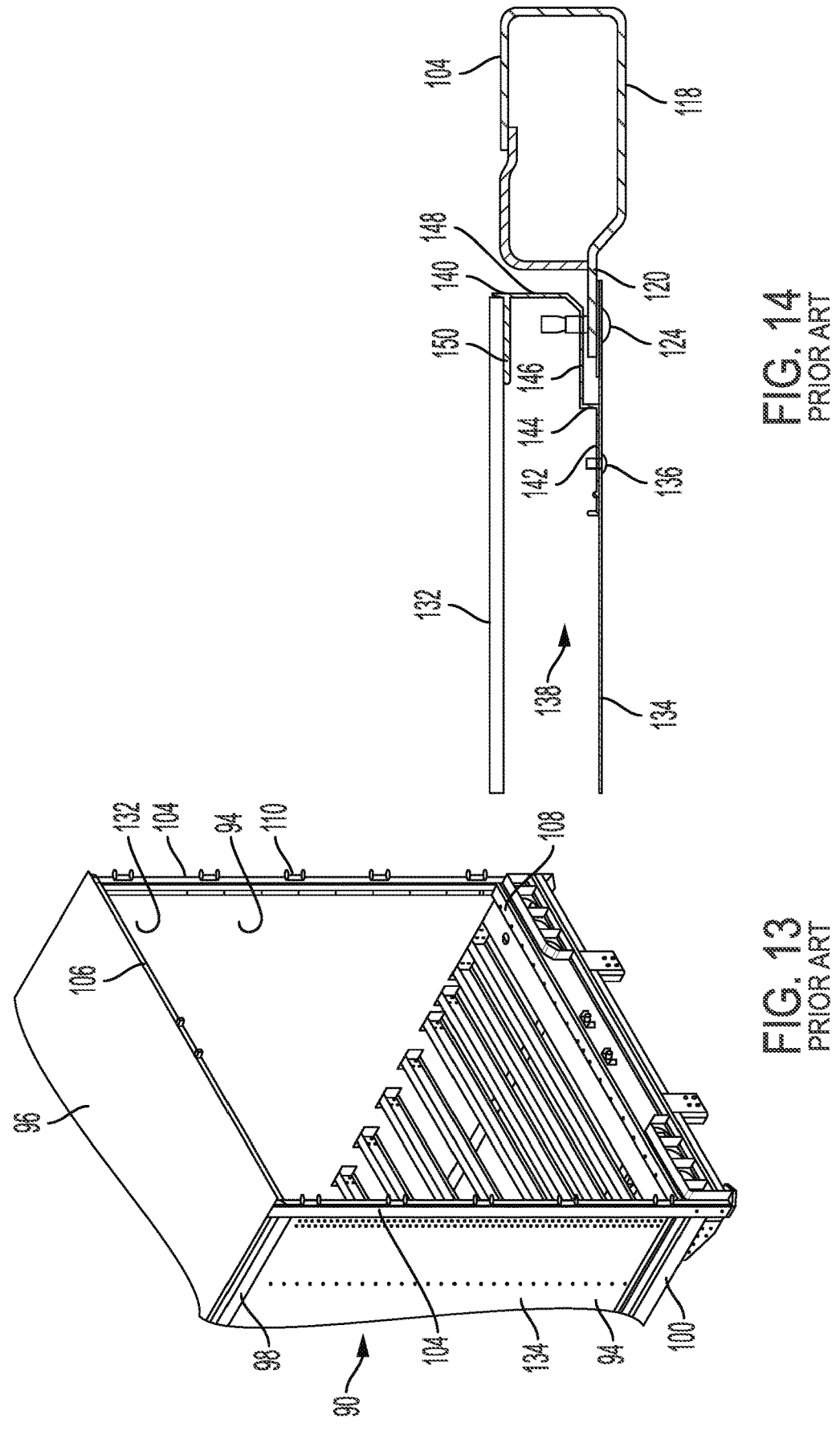
FIG. 13 is a partial perspective view of a prior art semi-trailer.
FIG. 14 is a top sectional view of the trailer as in FIG. 13.

In embodiments of any of the above-described, or other, semi-trailers, and with reference to FIG. 8, a plurality of wheels 34 support the trailer's rearward end and facilitate the semi-trailer's movement when coupled to a tractor (not shown). Wheels 34 may rotate about axes defined by a plurality of axles 11 that extend transverse to the trailer's longitudinal dimension 31 (FIGS. 2, 4, and 6) and transfer the load from the cargo on the cargo deck through the trailer's suspension to the wheels. The axles may support a suspension system, or "bogie," for example an air ride suspension or a leaf spring system, that is attached to longitudinally extending slide rails 46 upon which the suspension elements are adjustably attached and that attach to the deck assembly's floor support cross members 50 so that load from the cargo interior transfers to the axles and the wheels from the axles' attachment to the support members via the suspension. As should be understood, the trailer's wheels 34, axles 11, and suspension comprise the trailer's running gear. A front end of the semi-trailer may include a kingpin 23 that is configured to engage the trailer with a fifth wheel (not shown) of the tractor. The fifth wheel may include a flat plate that is typically greased so that a lower surface of the trailer slides against an upper surface of the fifth wheel. A fifth wheel coupling enables the trailer to pivot in the horizontal plane with respect to the tractor.

Figure 3:
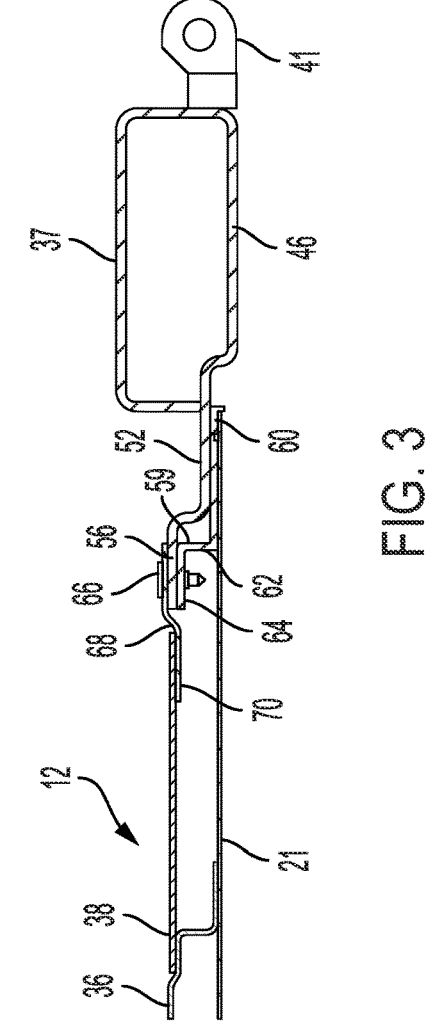
FIG. 3 is a partial top sectional view of the trailer as in FIG. 2.

FIG. 3 provides a top section view of the leftward fabricated (or, in one or more other embodiments, roll form) steel rear post 37 as it attaches to its sheet-and-post side wall 12 (See FIG. 2) comprised of a plurality of vertical posts 36, interior side wall liner panels 38 and outer skin 21. Rear post 37 comprises a main, generally rectangular, portion 46, a first flange 52 offset inward from the trailer exterior (toward the opposing side wall across the cargo volume), and a second flange 56 offset inward from first flange 52. This cross section of post 37 is generally consistent along the post's length from rear bottom sill 35 to rear top rail 39 (FIG. 2). Along the same length, a zee-shaped aluminum extrusion 59 generally maintains the cross-sectional geometry shown in FIG. 3, comprising a first flange 60 that is generally planar with an exterior face parallel to the trailer exterior, a generally planar center portion 62 that is generally perpendicular to the plane of first flange 60, and a generally planar third flange 64 that is generally perpendicular to second flange 62 and parallel to first flange 60. Third flange 64 is offset inward (toward the opposing side wall across the cargo volume) of first flange 60.

Aluminum extrusion 59 forms a joint between steel rear post 37 and side wall 12. Extrusion first flange 60 sits flush on its inward side against rear post first flange 52 and on its exterior side receives outer skin 21, which is affixed to first joint flange 60 by a structural adhesive, such as an epoxy. A plurality of vertically spaced apart drill screws 66 (one of which is shown in FIG. 3) extend through a steel secondary joint 68, second flange 56 of steel post 37, and third flange 64 of joint 59, thereby fixing those components to each other. The rearmost interior side wall liner panel 38 is received flush against a flange 70 of secondary joint 68 that is offset outward (toward the trailer side wall exterior, away from the opposing side wall across the cargo volume) from the first portion of secondary joint 68 so that the interior surface of liner panel 38 (and the interior surface of the other inner liner panels of side wall 12) is outward of a plane parallel to generally planar outer skin 21 that includes the inward head of drill screw 66. Liner panel 38 is affixed to second extrusion flange 70 by adhesive or other suitable mechanism. Thus, side wall 12 is affixed to rear vertical post 37 through the use of adhesive and drill screws 66 that do not extend through the exterior of skin 21, thereby avoiding interruption of the exterior surface of the continuous (over the length of the side wall) skin 21 at its rearward end, thereby providing a fastenerless outer rear edge of the side wall when viewed from the trailer exterior.

In another embodiment, steel secondary joint 68 is omitted, and third flange 64 of extrusion 59 extends leftward (in the view of FIG. 3) to receive the inner surface of inner liner panel 38 and attach thereto by a suitable adhesive. In such embodiments, drill screws 66 remain, to connect second flange 56 of steel post 37 and third flange 64 of joint 59.

FIG. 5 provides a top section view of the leftward fabricated (or roll form) steel rear post 37 as it attaches to its plate-type side wall 12 (see FIG. 4). Rear post 37 comprises of one or more composite plates 47. Rear post 37 comprises a main, generally rectangular, portion 46, a first flange 52 offset inward from the trailer exterior (toward the opposing side wall across the cargo volume), and a second flange 56 extending inward from first flange 52. This cross section of post 37 is generally consistent along its length from rear bottom sill 35 to rear top rail 39 (FIG. 4). Along the same length, an aluminum extrusion 59 generally maintains the cross-sectional geometry shown in FIG. 5, comprising a first flange 60 that is generally planar with an exterior face parallel to the trailer exterior, a generally planar center portion 62 that is generally perpendicular to the plane of first flange 60, a generally planar third flange 64 that is generally perpendicular to second flange 62 and parallel to first flange 60, and a generally planar fourth flange 72 that is generally perpendicular to flange 62 and parallel to first flange 60. Each of third flange 64 and fourth flange 72 is offset inward (toward the opposing side wall across the cargo volume) of first flange 60, and third flange 64 is offset inward of fourth flange 72.

Aluminum extrusion 59 forms a joint between steel rear post 37 and wall 12. Extrusion first flange 60 sits flush on its inward side against the exterior surface of rear post first flange 52. The exterior side of extrusion fourth flange 72 receives composite plate 47, which is affixed to fourth joint flange 72 by a structural adhesive, such as an epoxy. A plurality of vertically spaced apart drill screws 66 (one of which is shown in FIG. 5) extend through second flange 56 of steel post 37 and third flange 64 of joint 59, thereby fixing those components to each other. Thus, side wall 12 is affixed to rear vertical post 37 through the use of adhesive and drill screws 66 that do not extend through the exterior of plate 47, thereby avoiding interruption of the exterior surface of plate 51 at its rearward end and providing a fastenerless outer rear edge of the side wall when viewed from the trailer exterior.

FIG. 7 provides a top section view of the leftward steel rear post 37 as it attaches to its refrigerated trailer side wall 12 (See FIG. 6) comprised of an inner FRP panel 61 and one or more exterior '040' aluminum panels 63 separated by foam 78 therebetween. In one or more embodiments, the trailer side wall has a single exterior panel that is continuous over the trailer's length. In one or more other embodiments, the side wall has multiple exterior panels, each overlapping its adjacent one or more exterior panels and affixed thereto by structural adhesive or fasteners. Rear post 37 comprises a main, generally rectangular, portion 46 and a first flange 52 offset inward from the trailer exterior (toward the opposing side wall across the cargo volume). This cross section of post 37 is generally consistent along its length from rear bottom sill 35 to rear top rail 39 (FIG. 6). Along the same length, extrusion 59 generally maintains the cross-sectional geometry shown in FIG. 7, comprising a first flange 60 that is generally planar with an exterior face parallel to the trailer exterior, a generally planar first center portion 62 that is generally perpendicular to the plane of first flange 60, a generally planar third flange 64 that is generally perpendicular to second flange 62 and parallel to first flange 60, a generally planar second center portion 80 that is generally perpendicular to the planes of first flange 60 and third flange 64, and a generally planar fifth flange 74 that is generally perpendicular to flanges 62 and 80 and parallel to first flange 60 and third flange 64. Each of third flange 64 and fifth flange 74 is offset inward (toward the opposing side wall across the cargo volume) of first flange 60, and fifth flange 74 is offset inward of third flange 64.

Aluminum extrusion 59 forms a joint between fabricated (or roll form) steel rear post 37 and side wall 12. The exterior of extrusion first flange 60 receives the interior side of the rearmost exterior aluminum panel 63, which is affixed to first flange 60 by a structural adhesive, such as an epoxy. The interior side of extrusion fifth flange 74 receives an elongated polystyrene foam block 76, that is affixed to fifth joint flange 74 by adhesive, which may be a structural adhesive, and that is affixed to inner FRP panel 61 by a similar adhesive. Foam 78 fills the volume between panels 61 and 63, foam block 76 and joint 59. A plurality of vertically spaced apart drill screws 66 (one of which is shown in FIG. 7) extend through flange 52 of roll form steel post 37 and third flange 64 of joint 59, thereby fixing those components to each other. Thus, side wall 12 is affixed to rear vertical post 37 through the use of adhesive and drill screws 66 that do not extend through the exterior of exterior liner 63, thereby avoiding interruption of the exterior surface of exterior liner 63 at its rearward end and providing a fastenerless outer rear edge of the side wall when viewed from the trailer exterior.

In one or more other embodiments, polystyrene block 76 is omitted. Second center portion 80 of joint 59 is extended so that generally planar fifth flange 74 directly receives inner panel 61 and is secured thereto by a structural adhesive.

The extruded aluminum joints 59 of the several embodiments discussed herein move the fastener connection between the plate and the rear vertical post inward from the trailer exterior. As discussed above, that allows, in one or more embodiments, a fastenerless seam between the trailer side wall rear edge and the vertical post, when viewed from the trailer exterior. Also, in one or more embodiments, it allows the use of drill screws, rather than rivets, to make the fastener connection. When the fastener connection is made at the side wall exterior by rivets, two operators are required, on either side of the side wall, to install the rivets. The use of the drill screws, as discussed herein, require only one operator.

As discussed above, FIGS. 3, 5, and 7 illustrate one of the two (the leftward, in the views of FIGS. 2, 4, and 6, respectively) rear vertical steel posts (see 37) in the trailers illustrated in FIGS. 2, 4, and 6. Each of the other of the two posts for each trailer, and its connection to its corresponding side wall, including a corresponding extruded aluminum joint (see 59), on the right side of the trailer is the same as on the left, though a mirror image.

While one or more embodiments of the disclosure are described above, it should be appreciated by those skilled in the art that various modifications and variations can be made in the present disclosure without departing from the scope and spirit thereof. Accordingly, it should be understood that the elements of one embodiment may be combined with another embodiment to create a still further embodiment. It is intended that the present disclosure cover such modifications and variations as come within the scope and spirit of the present disclosure, the appended claims, and their equivalents.

What is claimed is:

1. A semi-trailer, comprising:
a wheeled chassis having at least two wheeled axles at a rearward end of the wheeled chassis, retractable legs, and a kingpin at a forward end of the wheeled chassis, wherein the wheeled chassis is elongated in a longitudinal dimension from the forward end to the rearward end;
a body comprising
a cargo deck supported by the wheeled chassis,
a front wall at the forward end of the wheeled chassis,
a pair of opposing side walls extending between the front wall and the rearward end of the wheeled chassis,
a rear frame attached to the rearward end of the wheeled chassis and to each side wall at a rearward end of the side wall so that a cargo volume is bounded by the cargo deck, the front wall, the pair of opposing side walls, and the rear frame, wherein the rear frame has a first post extending vertically at a side of the rear frame adjacent a rear end of a first side wall of the pair of opposing side walls, and
a first joint disposed between the first post and the rear end of the first side wall, wherein the first joint comprises
a first portion that defines a first receiving surface that receives a portion of the rear end of the first side wall that includes a surface of the first side wall that is exterior with respect to the cargo volume, and
a second portion offset, in a dimension transverse to the longitudinal dimension and inward with respect to the cargo volume, from the first portion that defines a second receiving surface that receives a portion of the first post; and
at least one fastener that extends through the portion of the first post and the second portion of the first joint, without extending through the exterior surface of the first side wall.

2. The semi-trailer as in claim 1, wherein each of the first post and the first joint is elongated and extends vertically in its dimension of elongation.

3. The semi-trailer as in claim 2, wherein the first post is made of aluminum.

4. The semi-trailer as in claim 2, wherein the rear frame has a second post, extending vertically at a side of the rear frame adjacent a rear end of a second side wall of the pair of opposing side walls.

5. The semi-trailer as in claim 4, comprising a second joint disposed between the second post and the rear end of the second side wall,
wherein the second joint comprises
a third portion that defines a third receiving surface that receives a portion of the rear end of the second side wall that includes a surface of the second side wall that is exterior with respect to the cargo volume, and
a fourth portion offset, in a dimension transverse to the longitudinal dimension and inward with respect to the cargo volume, from the third portion that defines a fourth receiving surface that receives a portion of the second post, and
at least one fastener that extends through the portion of the second post and the fourth portion of the second joint, without extending through the exterior surface of the second side wall.

6. The semi-trailer as in claim 2, where the first side wall comprises a composite panel having a foam core.

7. The semi-trailer as in claim 6, wherein the first side wall comprises an aluminum skin sheet on an exterior side of the foam core and a polymer skin sheet on an interior side of the foam core, and wherein a rear end of the aluminum skin sheet is the portion of the rear end of the first side wall that is received at the first portion.

8. The semi-trailer as in claim 7, wherein the first joint comprises a third portion that is offset, in the transverse dimension and inward with respect to the cargo volume from the first portion that defines a third receiving surface, and wherein the first side wall comprises a polystyrene block disposed between the polymer skin sheet and the third receiving surface.

9. The semi-trailer as in claim 2, wherein the first side wall is comprised of a plurality of structural panels disposed adjacent to each other, wherein the structural panels define both an interior surface of the first side wall and the exterior surface of the side wall, and wherein the interior surface of the first side wall comprises the portion of the rear end of the first side wall.

10. The semi-trailer as in claim 2, wherein the first side wall is comprised of an exterior sheet, an interior sheet, and a plurality of elongated posts disposed, vertically in their dimension of elongation, between the interior sheet and exterior sheet and spaced apart from each other.

11. The semi-trailer as in claim 10, wherein the exterior sheet comprises the portion of the rear end of the first side wall.

12. A semi-trailer, comprising:
a wheeled chassis having at least two wheeled axles at a rearward end of the wheeled chassis, retractable legs, and a kingpin at a forward end of the wheeled chassis, wherein the wheeled chassis is elongated in a longitudinal dimension from the forward end to the rearward end;
a body comprising
a cargo deck supported by the wheeled chassis,
a front wall at the forward end of the wheeled chassis,
a pair of opposing side walls extending between the front wall and the rearward end of the wheeled chassis,
a rear frame attached to the rearward end of the wheeled chassis and to each side wall at a rearward end of the side wall so that a cargo volume is bounded by the cargo deck, the front wall, the pair of opposing side walls, and the rear frame, wherein the rear frame has
a first elongated post extending vertically in its dimension of elongation at a side of the rear frame adjacent a rear end of a first side wall of the pair of opposing side walls, and a second elongated post extending vertically in its dimension of elongation at a side of the rear frame adjacent a rear end of a second side wall of the pair of opposing side walls, a first joint disposed between the first post and the rear end of the first side wall, and a second joint disposed between the second post and the rear end of the second side wall, wherein the first joint comprises a first portion that defines a first receiving surface that receives a portion of the rear end of the first side wall that includes a surface of the first side wall that is exterior with respect to the cargo volume, and a second portion offset, in a dimension transverse to the longitudinal dimension and inward with respect to the cargo volume, from the first portion that defines a second receiving surface that receives a portion of the first post wherein the second joint comprises a third portion that defines a third receiving surface that receives a portion of the rear end of the second side wall that includes a surface of the second side wall that is exterior with respect to the cargo volume, and a fourth portion offset, in a dimension transverse to the longitudinal dimension and inward with respect to the cargo volume, from the third portion that defines a fourth receiving surface that receives a portion of the second post; and a plurality of fasteners that extend through the portion of the first post and the second portion of the first joint, without extending through the exterior surface of the first side wall; and a plurality of fasteners that extend through the portion of the second post and the fourth portion of the second joint, without extending through the exterior surface of the second side wall.

\*  \*  \*  \*  \*